United States Patent
Hasegawa (10) Patent No.: US 8,824,019 B2
(45) Date of Patent: Sep. 2, 2014

(54) IMAGE PROCESSING APPARATUS, CHARGING SYSTEM, CHARGING METHOD, AND PROGRAM

(75) Inventor: Kazuhide Hasegawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 236 days.

(21) Appl. No.: 13/232,817

(22) Filed: Sep. 14, 2011

(65) Prior Publication Data

US 2012/0069372 A1    Mar. 22, 2012

(51) Int. Cl.
| H04N 1/409 | (2006.01) |
| H04N 1/00 | (2006.01) |
| H04N 1/34 | (2006.01) |
| G06F 3/12 | (2006.01) |

(52) U.S. Cl.
CPC ...... *H04N 1/0087* (2013.01); *H04N 2201/0094* (2013.01); *H04N 1/00883* (2013.01); *H04N 2201/3269* (2013.01); *H04N 1/342* (2013.01); *H04N 1/346* (2013.01)
USPC ....... 358/3.28; 358/1.13; 358/1.18; 358/1.15; 358/538; 358/453; 358/537; 345/629

(58) Field of Classification Search
CPC ............ H04N 1/00867; H04N 1/0087; H04N 1/32144; H04N 1/32229; H04N 1/32315; G06F 3/1218; G06F 3/1232; G06F 3/1243; G06Q 30/0273; G06Q 30/0283; G06Q 10/06; G06G 21/02
USPC .................. 358/1.1, 1.2, 1.9, 2.1, 1.11–1.18, 358/400–404; 709/201–203, 223; 399/24–31, 79–82; 705/400, 402, 408, 705/34

See application file for complete search history.

(56) References Cited

U.S. PATENT DOCUMENTS

| 6,628,417 | B1 * | 9/2003 | Naito et al. .................. 358/1.15 |
| 7,006,247 | B1 * | 2/2006 | Sekine et al. .................. 358/1.9 |
| 8,456,672 | B2 * | 6/2013 | Oba ............................. 358/1.15 |
| 8,456,682 | B2 * | 6/2013 | Yamakawa et al. .......... 358/1.15 |
| 2002/0041394 | A1 * | 4/2002 | Aoki ............................ 358/1.15 |
| 2005/0179937 | A1 * | 8/2005 | Horihata ...................... 358/1.15 |
| 2005/0225796 | A1 * | 10/2005 | Horihata ...................... 358/1.15 |
| 2007/0092281 | A1 * | 4/2007 | Saito .............................. 399/79 |
| 2010/0088201 | A1 * | 4/2010 | Nagarajan et al. .............. 705/29 |

FOREIGN PATENT DOCUMENTS

| JP | 2009-282947 A | 12/2009 |
| JP | 2010-089486 A | 4/2010 |

\* cited by examiner

*Primary Examiner* — Chad Dickerson
(74) *Attorney, Agent, or Firm* — Canon USA, Inc., IP Division (57) ABSTRACT

An image processing apparatus may include a generation unit, a calculation unit, and a storing unit. The generation unit generates, from job data, image data independent of a model of the image processing apparatus. The calculation unit calculates charging information about contents included in the image data and charging information about additional information added to the image data. The storing unit stores the charging information about the contents and the charging information about the additional information for each charging destination stored in a storage unit.

9 Claims, 7 Drawing Sheets

| FUNCTIONS | PROCESSING UNITS | CHARGING DESTINATIONS | CHANGE OF CHARGING DESTINATION |
|---|---|---|---|
| DEVICE COPY-FORGERY-INHIBITED PATTERN | POST-PROCESSING IMAGE DRAWING UNIT | SYSTEM | POSSIBLE |
| HOST COPY-FORGERY-INHIBITED PATTERN | DATA DRAWING UNIT | SYSTEM | POSSIBLE |
| EMBEDMENT OF TRACE INFORMATION | POST-PROCESSING IMAGE DRAWING UNIT | SYSTEM | IMPOSSIBLE |
| TONER SAVE | DATA DRAWING UNIT | USER | POSSIBLE |
| NUMBER OF PRINT COPIES | POST-PROCESSING IMAGE DRAWING UNIT | USER | POSSIBLE |

FIG.5

| | DATE | JOB ID | DOCUMENT NAME | NUMBER OF PAGES | USER NAME | USER CHARGING (YEN) | SYSTEM CHARGING (YEN) | FUNCTIONS |
|---|---|---|---|---|---|---|---|---|
| 509 | 2010/06/25 | 5001 | Print Spec | 25 | UserA | 300 | 50 | DEVICE COPY-FORGERY-INHIBITED PATTERN |
| 510 | 2010/06/25 | 5002 | Weekly | 12 | UserB | 110 | 10 | DEVICE COPY-FORGERY-INHIBITED PATTERN |
| 511 | 2010/06/25 | 5003 | New Model | 36 | UserC | 560 | 80 | DEVICE COPY-FORGERY-INHIBITED PATTERN |
| 512 | 2010/06/25 | 5004 | Flow Report | 5 | UserA | 30 | 1 | DEVICE COPY-FORGERY-INHIBITED PATTERN/EMBEDMENT OF TRACE INFORMATION |

IMAGE PROCESSING APPARATUS, CHARGING SYSTEM, CHARGING METHOD, AND PROGRAM

BACKGROUND OF THE INVENTION

1. Field of the Invention

The present invention relates to an image processing apparatus, a charging system, a charging method, and a program.

2. Description of the Related Art

In recent years, a method has been discussed which estimates the consumed amount of toner from image data subjected to rendering process and output (Japanese Patent Application Laid-Open No. 2009-282947, for example). Another method has been discussed which calculates the number of pixels from device-independent image data to estimate the number of device-dependent pixels (Japanese Patent Application Laid-Open No. 2010-89486, for example). Yet another method has been known in which a system manger performs setting so that additional contents such as a copy-forgery-inhibited pattern and a two-dimensional bar code for tracking are combined with contents designated by a user and output to ensure security.

In conventional methods, however, the consumed amount of toner is estimated from a final output image, so that, even if the user outputs the same document and if the output destinations use different models, it may cause an issue that a different amount is charged according to the model. Another issue is caused that an image portion designated by the user (such as contents created by the user) and an image portion designated by the system manger (such as the copy-forgery-inhibited pattern) cannot be appropriately charged.

SUMMARY OF THE INVENTION

The present invention relates to appropriate charging to output in an image processing apparatus.

According to an aspect of the present invention, an image processing apparatus includes: a generation unit configured to generate, from job data, image data independent of a model of the image processing apparatus; a calculation unit configured to calculate charging information about contents included in the image data and charging information about additional information added to the image data; and a storing unit configured to store the charging information about the contents and the charging information about the additional information for each charging destination stored in a storage unit.

According to another aspect of the present invention, a charging system includes an image processing apparatus; and an information processing apparatus, wherein the information processing apparatus includes: a transmission unit configured to calculate charging information about additional information added to image data independent of a model of the image processing apparatus and transmit to the image processing apparatus of the charging system job data used for generating the image data by adding the charging information about the additional information thereto, and wherein the image processing apparatus includes: a reading unit configured to read the charging information about the additional information from the job data, a generation unit configured to generate the image data from the job data, a calculation unit configured to calculate charging information about contents included in the image data, and a storing unit configured to store the charging information about the contents and charging information about the additional information in a storage unit for each charging destination.

According to the present invention, appropriate charging can be performed to output in the image processing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings. The exemplary embodiments which will be described below do not restrict to the invention according to the claims. All of combinations of the features described in the exemplary embodiments are not always essential to ways for solution according to the invention.

Figure 1:
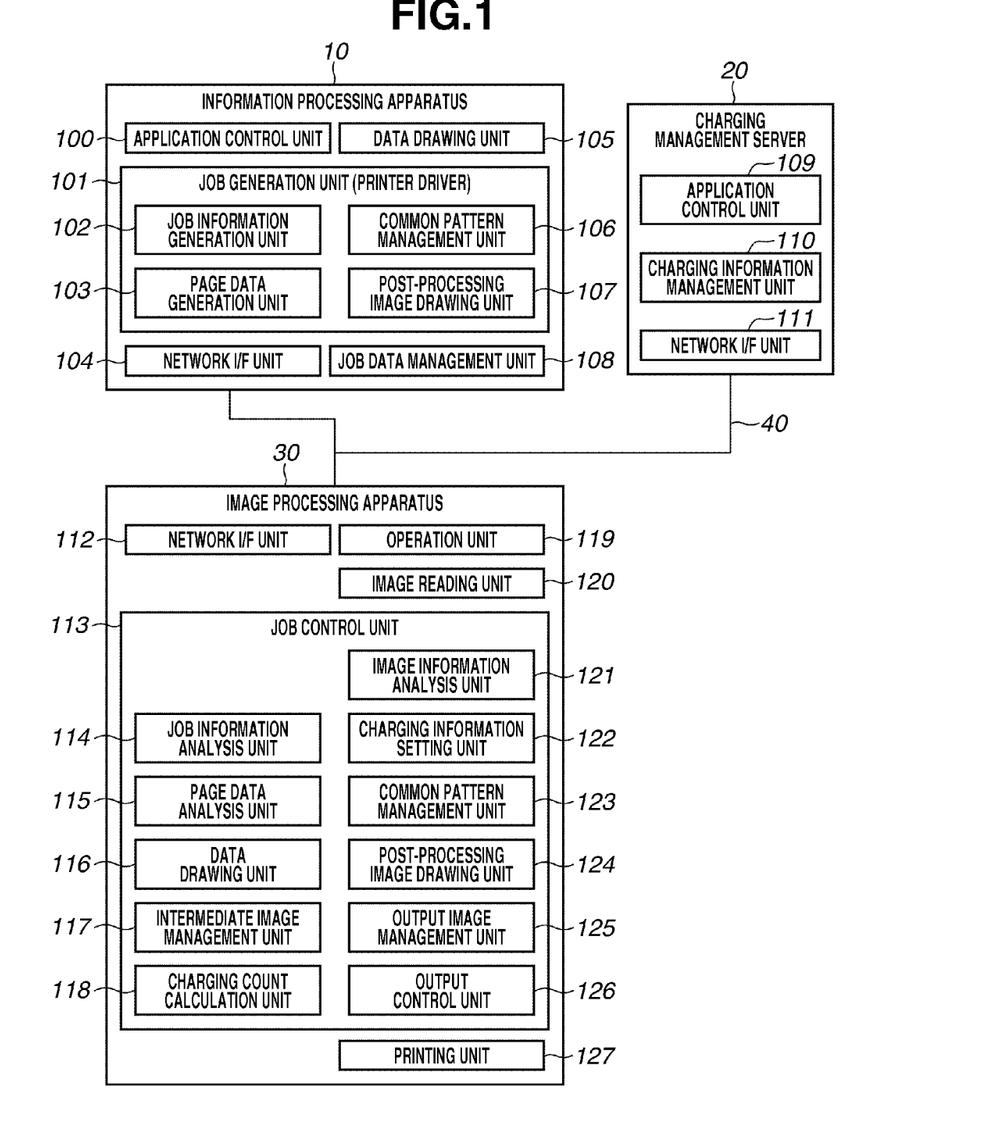
FIG. 1 illustrates an example of a configuration of a charging system.

FIG. 1 illustrates an example of a configuration of a charging system (an image processing system) according to the present exemplary embodiment. The image processing system includes an information processing apparatus 10, a charging management server 20, and an image processing apparatus 30. The information processing apparatus 10, the charging management server 20, and the image processing apparatus 30 are communicably connected to one another via a network 40.

The information processing apparatus 10 and the charging management server 20 may use a general computer including a central processing unit (CPU), a display, a keyboard, a mouse, a hard disk drive (HDD), a memory, and an interface for network communication. The CPU performs processing according to the procedure of a program stored in the HDD to realize a function and processing in the information processing apparatus 10 (or the charging management server 20).

The image processing apparatus 30 may use a general image processing apparatus (a printer, a multifunction peripheral, or the like) including a CPU, a display, an operation button, a memory, an HDD, an interface for printing, an interface for a scanner, and an interface for communication. The CPU performs processing according to the procedure of a program stored in a storage unit (the memory and the HDD) to realize a function and processing in the image processing apparatus 30.

The information processing apparatus 10 includes an application control unit 100, a job generation unit 101, a network I/F (interface) unit 104, a data drawing unit 105, and a job data management unit 108. The application control unit 100 displays an operation screen of an application executed by the information processing apparatus 10 on the display of the information processing apparatus 10 and receives various operations from a user (user operation) via an input unit such as the keyboard and the mouse.

The data drawing unit 105 receives an instruction to print application data from the application control unit 100 in response to the user operation and converts the application data into intermediate image data. The job generation unit 101 generates job data in a data format which can be printed by the image processing apparatus 30 based on the intermediate image data.

The job data management unit 108 manages (stores) the job data generated by the job generation unit 101 and transmits the job data to the image processing apparatus 30 via the network I/F unit 104. The network I/F unit 104 transmits data to and receives data from (communicates with) an external device. For example, the network I/F unit 104 transmits the job data to the image processing apparatus 30.

The job generation unit 101 is described in detail below. The job generation unit 101 includes a job information generation unit 102, a page data generation unit 103, a common pattern management unit 106, and a post-processing image drawing unit 107. The job information generation unit 102 generates job information including information about a user identification (ID) required for authenticating a job in the image processing apparatus 30 and print setting information such as setting indicating whether two-side printing, stapling, and a copy-forgery-inhibited pattern as a background are set. Further, the job information may include information about charging information about additional contents (additional information) such as driver copy-forgery-inhibited pattern (for further details, refer to a second exemplary embodiment).

The page data generation unit 103 generates page description language (PDL) data (page description information described in the page description language) which can be processed by the image processing apparatus 30 from the intermediate image data generated by the data drawing unit 105.

The common pattern management unit 106 manages a common image pattern (a plurality of types of pattern information) for drawing additional contents such as a copy-forgery-inhibited pattern. The post-processing image drawing unit 107 generates bit map data for additional contents in units of objects or in units of pages from the common image pattern managed by the common pattern management unit 106 (converts the common image pattern into bit map data).

The generated bit map data is combined with the intermediate image data and converted into the PDL data by the page data generation unit 103. The processing of the common pattern management unit 106 and the post-processing image drawing unit 107 is described in the second exemplary embodiment.

The charging management server 20 includes an application control unit 109, a charging information management unit 110, and a network I/F unit 111. The application control unit 109 performs various types of control for an application. The charging information management unit 110 manages charging information of job data processed by the image processing apparatus 30. The network I/F unit 111 transmits data to and receives data from (communicates with) an external device. For example, the network I/F unit 111 receives the charging information from the image processing apparatus 30.

The image processing apparatus 30 includes a network I/F unit 112, a job control unit 113, an operation unit 119, an image reading unit 120, and a printing unit 127. The network I/F unit 112 transmits data to and receives data from (communicates with) an external device. For example, the network I/F unit 112 receives job data from the information processing apparatus 10. The operation unit 119 displays various operation screens on the display of the image processing apparatus 30 to receive various operations from the user (user operation) via the input unit such as the operation button.

The image reading unit 120 reads image information of a document set by the user and converts the image information into bit map data. The job control unit 113 performs various types of control of the job data received via the network I/F unit 112 and provided by an instruction of the operation unit 119. The printing unit 127 forms an image of a video signal (an electric signal) to print out the image.

The job control unit 113 is described in more detail below. The job control unit 113 includes units 114 to 118 and 121 to 126 and controls the units. A job information analysis unit 114 analyzes each job attribute of job data. A page data analysis unit 115 analyzes each page data of the job data and converts each page data into intermediate data (e.g., a display list) in units of objects. Further, the page data analysis unit 115 stores (accumulates) the converted intermediate data in the RAM.

A data drawing unit 116 generates (converts) bit map data (e.g., a content image) in units of objects or in units of pages from the stored intermediate data in units of objects. Further, the data drawing unit 116 generates image-area information in the bit map data (object information such as a text, graphics, a raster image, and a background area where a copy-forgery-inhibited pattern is combined).

An intermediate image management unit 117 manages (stores) the content image and the image area information generated in the data drawing unit 116. A charging count calculation unit 118 calculates a charging count from the content image generated in the data drawing unit 116 and additional contents generated from the common image pattern managed by a common pattern management unit 123.

An image information analysis unit 121 analyzes the bit map data in units of pages converted from the electric signal by the image reading unit and recognizes objects such as a text, graphics, and a raster image. A charging information setting unit 122 manages charging destination information (e.g., a charging destination setting table 400) indicating a charging destination as to whether the calculation result of the charging count performed by the charging count calculation unit 118 in response to the user operation in the operation unit 119 is charged to the user or to the system. The common pattern management unit 123 manages a common image pattern (a plurality of types of pattern information) for drawing additional contents such as the copy-forgery-inhibited pattern.

A post-processing image drawing unit 124 combines the additional contents created from the common image pattern managed by the common pattern management unit 123 with the content image and converts the combined image into bit map data for output. An output image management unit 125 manages (stores) the bit map data for output combined by the post-processing image drawing unit 124. An output control unit 126 converts the bit map data for output in units of pages managed by the output image management unit 125 into a video signal and performs transfer processing in synchronization with image forming processing and paper feed processing in the printing unit 127.

Processing for converting job data received via the network I/F unit 112 and job data input via the operation unit 119 into an image for output is described in detail below with reference to FIG. 2.

Figure 2:
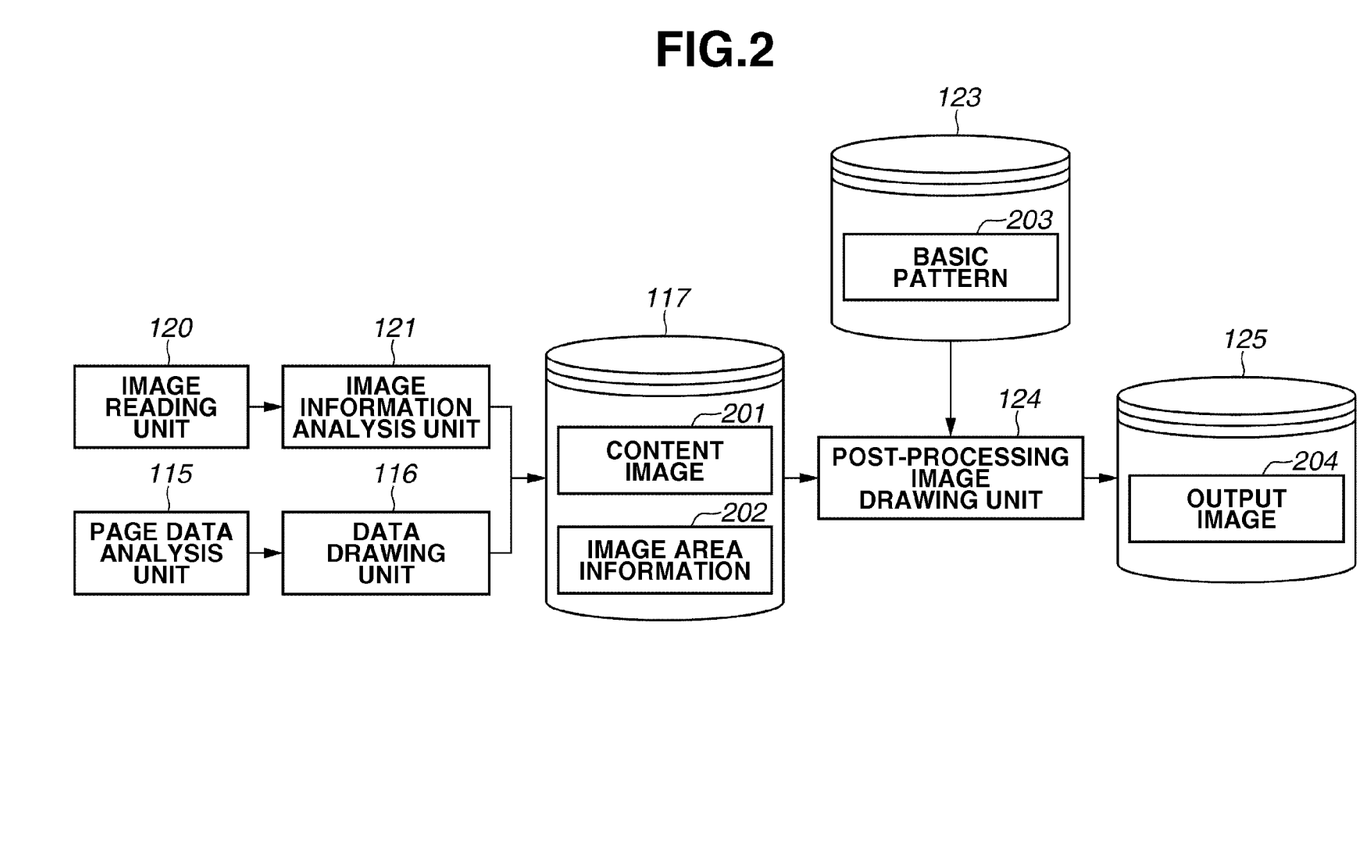
FIG. 2 illustrates an example of a configuration of an image processing apparatus.

FIG. 2 illustrates an example of a configuration of the image processing apparatus 30 which converts job data into an image for output (an output image).

When job data (scan job) is input by an instruction of the operation unit 119, the image reading unit 120 converts read image information of a document into bit map data (image data) and inputs the bit map data to the image information analysis unit 121. The image information analysis unit 121 recognizes objects such as a text, graphics, a raster image, and a background area where a copy-forgery-inhibited pattern is combined from the input bit map data, generates a content image 201 and image area information 202, and inputs them to the intermediate image management unit 117.

When job data (print job) received via the network I/F unit 112 is input, the page data analysis unit 115 analyzes the job data, converts the job data into intermediate data in units of objects, and inputs the intermediate data to the data drawing unit 116. The data drawing unit 116 generates bit map data (image data) from the input intermediate data and the image area information 202 in the bit map data, and inputs the content image 201 and the image area information 202 to the intermediate image management unit 117.

The content image 201 managed by the intermediate image management unit 117 is managed as common image data independent of the model of the image processing apparatus, in other words, data yet to be subjected to processing (halftone processing, color correction, and the like) dependent on the model. Therefore, the charging count calculation unit 118 calculates a charging count from the common image data to allow performing charging independent of the model (charging common to the model).

Both of the scan job input via the operation unit 119 and the print job input via the network I/F unit 112 are managed similarly by the intermediate image management unit 117 as the content image 201 and the image area information 202. Thus, in this example, the post-processing image drawing unit 124 can subject both of the scan job and the print job to common post-processing.

The post-processing image drawing unit 124 develops a common image pattern (basic pattern) 203 managed by the common pattern management unit 123 to a page according to the image area information 202, combines the common image pattern 203 with the content image 201, and inputs an output image 204 to the output image management unit 125. Further, the post-processing image drawing unit 124 subjects the content image 201 common to the model to the halftone processing and the color correction to convert the content image 201 into an image dependent on the model (a model dependence image).

The output image 204 converted by the post-processing image drawing unit 124 is the model dependence image. However, the common image pattern 203 is common to the models and the charging count calculation unit 118 calculates the charging count from the common image pattern 203, so that charging independent of the model can be performed.

Processing for calculating the charging information in a case where a device copy-forgery-inhibited pattern is added in the print job input via the network I/F unit 112 is described in detail below with reference to FIGS. 3 to 5.

Figure 3:
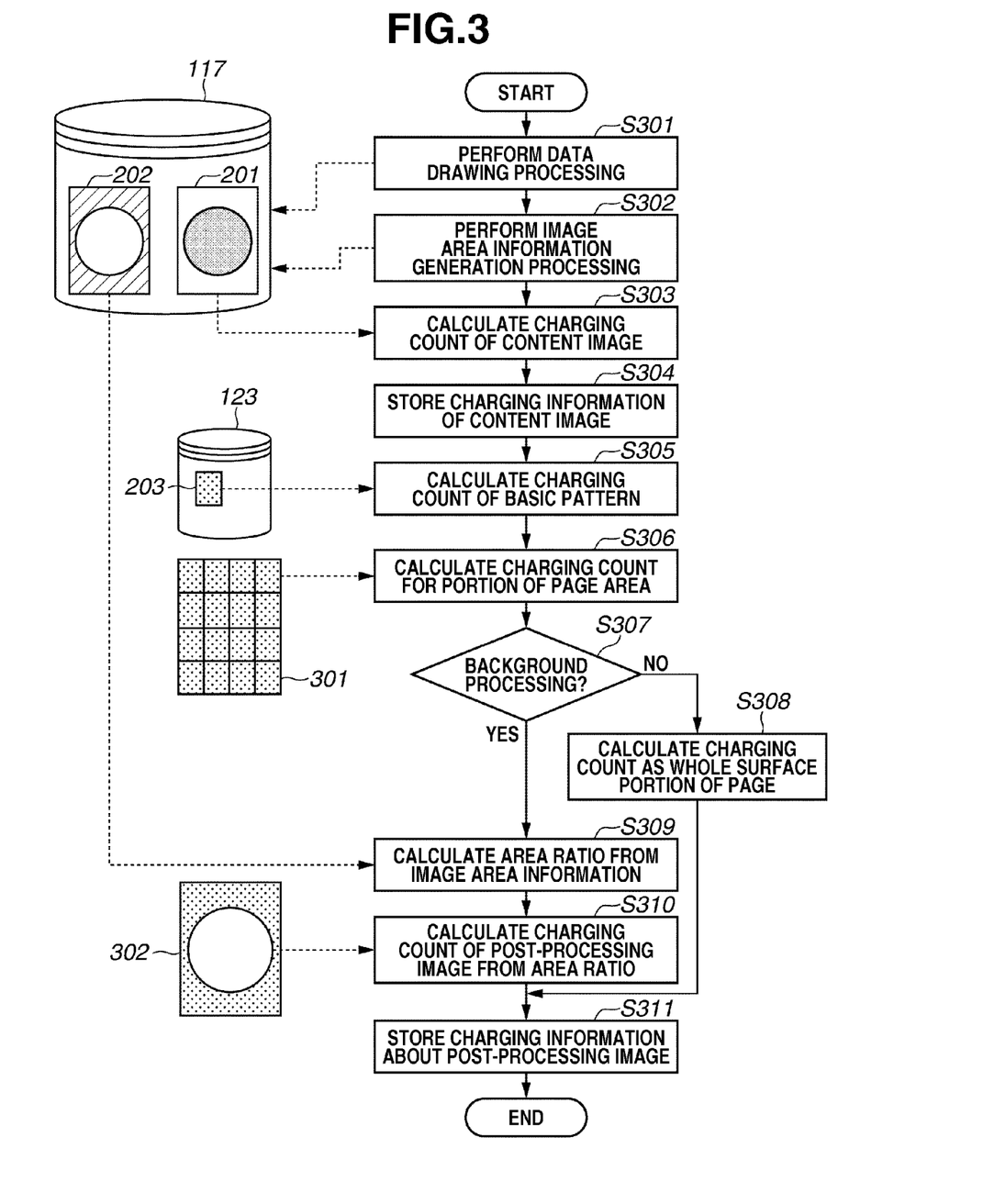
FIG. 3 illustrates an example of a flow chart related to charging processing.

FIG. 3 illustrates an example of a flow chart related to processing (charging processing) for calculating the charging information in the print job including information indicating that the device copy-forgery-inhibited pattern is added.

In step S301, the data drawing unit 116 generates bit map data (a content image 201) from the intermediate data input from the page data analysis unit 115 and inputs the content image 201 to the intermediate image management unit 117. In step S302, the data drawing unit 116 generates the image area information 202 in the bit map data and inputs the image area information 202 to the intermediate image management unit 117. In other words, the data drawing unit 116 generates the image area information 202 (area information) indicating an area different from the area where the content image 201 is arranged in the bit map data.

In step S303, the charging count calculation unit 118 calculates the charging count from the content image 201 generated in the data drawing unit 116. For example, the charging count calculation unit 118 acquires a charging value corresponding to a red-green blue (RGB) value of the content image 201 with reference to information common to the model of the image processing apparatus in which the RGB value is associated with the charging value (information specified so that the charging value increases according as color becomes dark) to calculate the charging count. In step S304, the charging count calculation unit 118 temporarily stores the charging information about the content image 201 in the memory (storage area) as charging for the user.

In step S305, the charging count calculation unit 118 reads the common image pattern 203 from the common pattern management unit 123 to calculate the charging count of the single unit of the common image pattern 203. For example, the charging count calculation unit 118 reads the common image pattern 203 corresponding to print setting information (specific information) that can identify the common image pattern of the device copy-forgery-inhibited pattern included in the job information in the job data. The charging count calculation unit 118 calculates the charging information about the single unit of the common image pattern 203 with reference to the information in which the common image pattern 203 is associated with the charging value.

In other words, the charging count calculation unit 118 acquires the charging value of pattern information of additional information specified by the user operation (by a printer driver) from the charging value of pattern information of a plurality of types of additional information which are set in advance.

In step S306, the charging count calculation unit 118 calculates the charging count at the time when the single unit of the common image pattern 203 is developed to a whole page area from the page information analyzed by the page data analysis unit 115.

A common image pattern aggregation 301 represents a concept at the time when the single unit of the common image pattern 203 is developed to the whole page area, and the single unit of the common image pattern 203 is not subjected to development processing herein. The actual development processing of the single unit of the common image pattern 203 is performed at the time when the post-processing image drawing unit 124 performs combining processing. Therefore, the charging count of the common image pattern 203 can be calculated at a high speed without affecting print output processing.

In step S307, the charging count calculation unit 118 determines whether the copy-forgery-inhibited pattern processing is subjected to background processing or overwriting processing. If the charging count calculation unit 118 determines that the copy-forgery-inhibited pattern processing is subjected to the overwriting processing (NO in step S307), then in step S308, the charging count calculation unit 118 calculates the charging count as the whole page area (whole surface portion). The processing proceeds to step S311.

If the charging count calculation unit 118 determines that the copy-forgery-inhibited pattern processing is subjected to the background processing (YES in step S307), the charging count calculation unit 118 performs processing in step S309. For example, the charging count calculation unit 118 determines whether the copy-forgery-inhibited pattern processing is subjected to the background processing or the overwriting processing with reference to the print setting information indicating whether the copy-forgery-inhibited pattern included in the job information is taken as a background.

In step S309, the charging count calculation unit 118 calculates an area ratio of a background portion subjected to the copy-forgery-inhibited pattern processing to the whole page area based on the image area information 202. In step S310, the charging count calculation unit 118 calculates the charging count of the additional contents (a post-processing image) representing the background portion subjected to the copy-forgery-inhibited pattern processing from the calculated area ratio of the background portion subjected to the copy-forgery-inhibited pattern processing to the whole page area.

In step S311, the charging count calculation unit 118 temporarily stores charging information about the additional contents (the background portion subjected to the copy-forgery-inhibited pattern processing) in the storage area. At this point, the charging count calculation unit 118 stores the charging information about the additional contents for each charging destination with reference to the charging information (e.g., the charging destination setting table 400) in which the charging destination is specified for each function related to charging. In this example, the charging count calculation unit 118 determines a system manager as the charging destination corresponding to the device copy-forgery-inhibited pattern processing (function) and temporarily stores the charging information about the additional contents as charging for the system manager.

In the present exemplary embodiment, the charging information about the content image and the charging information about the additional contents are transmitted to the charging management server 20 and input to the charging information management unit 110 after the processing on all pages is completed.

Figure 4:
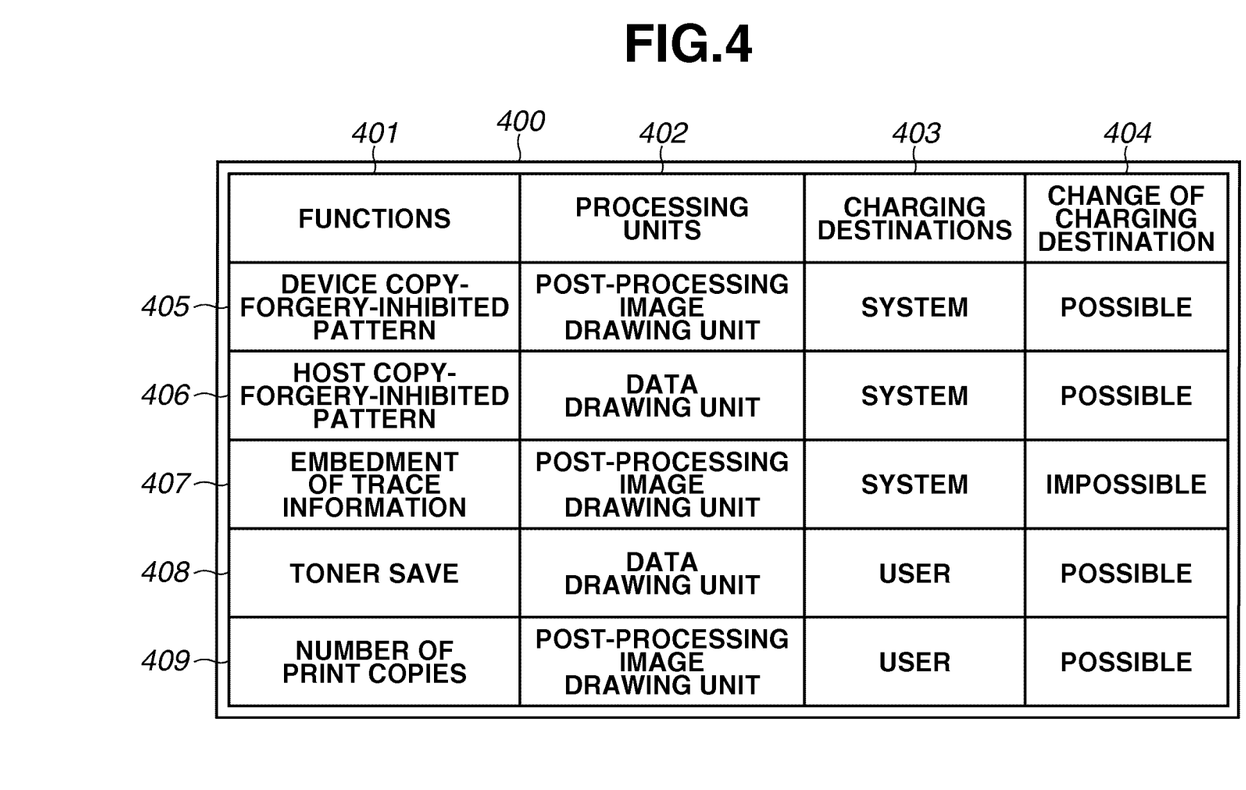
FIG. 4 illustrates an example of a table.

FIG. 4 illustrates an example of a table (the charging destination setting table 400) managed by the charging information setting unit 122. In the charging destination setting table 400, setting information is managed for each classification 401 of various functions related to the charging count. As the functions related to the charging count, there are exemplified a device copy-forgery-inhibited pattern 405, a host copy-forgery-inhibited pattern 406, the embedment of trace information 407, toner save 408, and the number of print copies 409.

The charging information setting unit 122 manages information about a processing unit 402 configured to perform the processing of various functions using the charging destination setting table 400. The charging count calculation unit 118 can switch a method for calculating the charging count from the content image and the additional contents according to the processing unit 402 using the information about the processing unit 402. In other words, in the charging destination setting table 400, the charging destination can be determined from the combination of the function and the processing unit.

Further, in the charging destination setting table 400, there is managed information about the charging destination 403 indicating whether results of calculation of the charging counts of various functions are taken as the user charging (charging to the user) or the system charging (charging to the system manager). The information about the charging destination 403 can be changed on a manager menu via the operation unit 119. In the present exemplary embodiment, the charging information management unit 110 of the charging management server 20 centrally manages whether the information about the charging destination 403 can be changed. The information is set as a charging destination change possibility 404. Accordingly, the charging count can be made common among a plurality of the image processing apparatus 30.

Figure 5:
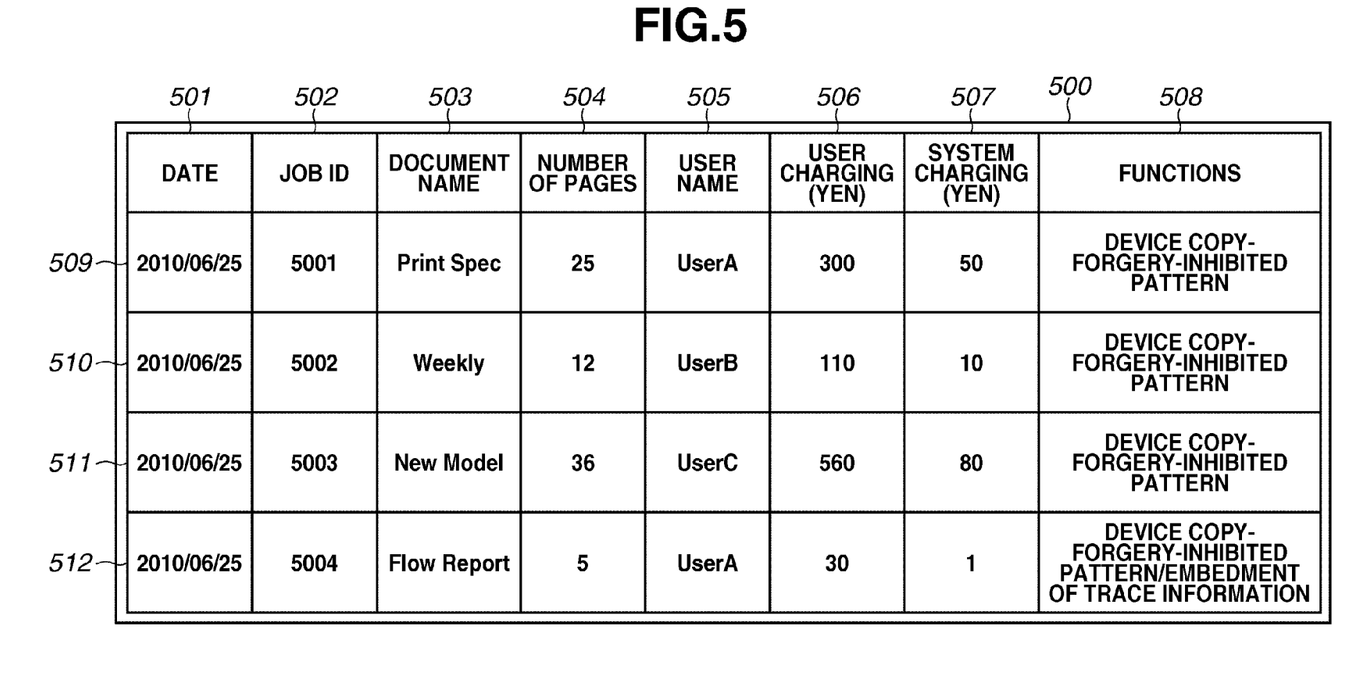
FIG. 5 illustrates an example of a table.

FIG. 5 illustrates an example of a table (a charging information management table 500) managed by the charging information management unit 110. The charging information management table 500 stores information such as a date 501 when a job is processed, a job ID 502, a document name 503, the number of output pages 504, and a user name 505. The charging information management table 500 further stores information such as user charging 506, system charging 507, and functions 508 designated by a job.

"One yen" of the system charging 507 corresponding to "5004" of the job ID 502 indicates the value of the charging count as the result of processing both of the "device copy-forgery-inhibited pattern" and the "embedment of trace information" in the functions 508. The present exemplary embodiment is not limited to this configuration. For example, a configuration may be adopted in which the user charging 506 and the system charging 507 are classified for each function and counted.

The above configuration allows the calculation of the charging information about the image independent of the model of the image processing apparatus (the image subjected to the rendering process). In other words, according to the present exemplary embodiment, in a case where the charging is made on a usage based rate, the charging information common to the model can be charged on the user instead of the charging information indicating the amount of toner consumption different for each model of the image processing apparatus. Consequently, if the model of the image processing apparatus is different, the same charging can be appropriately made to allow user convenience to be improved.

According to the above-described configuration, the charging for an image portion designated by the user and the charging for an image portion designated by the system manager are independently counted, so that the user convenience can be further improved.

In the first exemplary embodiment, a configuration is exemplified in which the charging count of the additional contents is calculated based on the image area information 202 generated by the data drawing unit 116 of the image processing apparatus 30 (in a case where the device copy-forgery-inhibited pattern is combined). In a second exemplary embodiment, a configuration is exemplified in which the information processing apparatus 10 generates job information including the charging information about the additional contents, and the image processing apparatus 30 calculates the charging count based on the job information (in a case where the driver copy-forgery-inhibited pattern is combined). The description of the configuration similar to that of the first exemplary embodiment is omitted herein.

Figure 6:
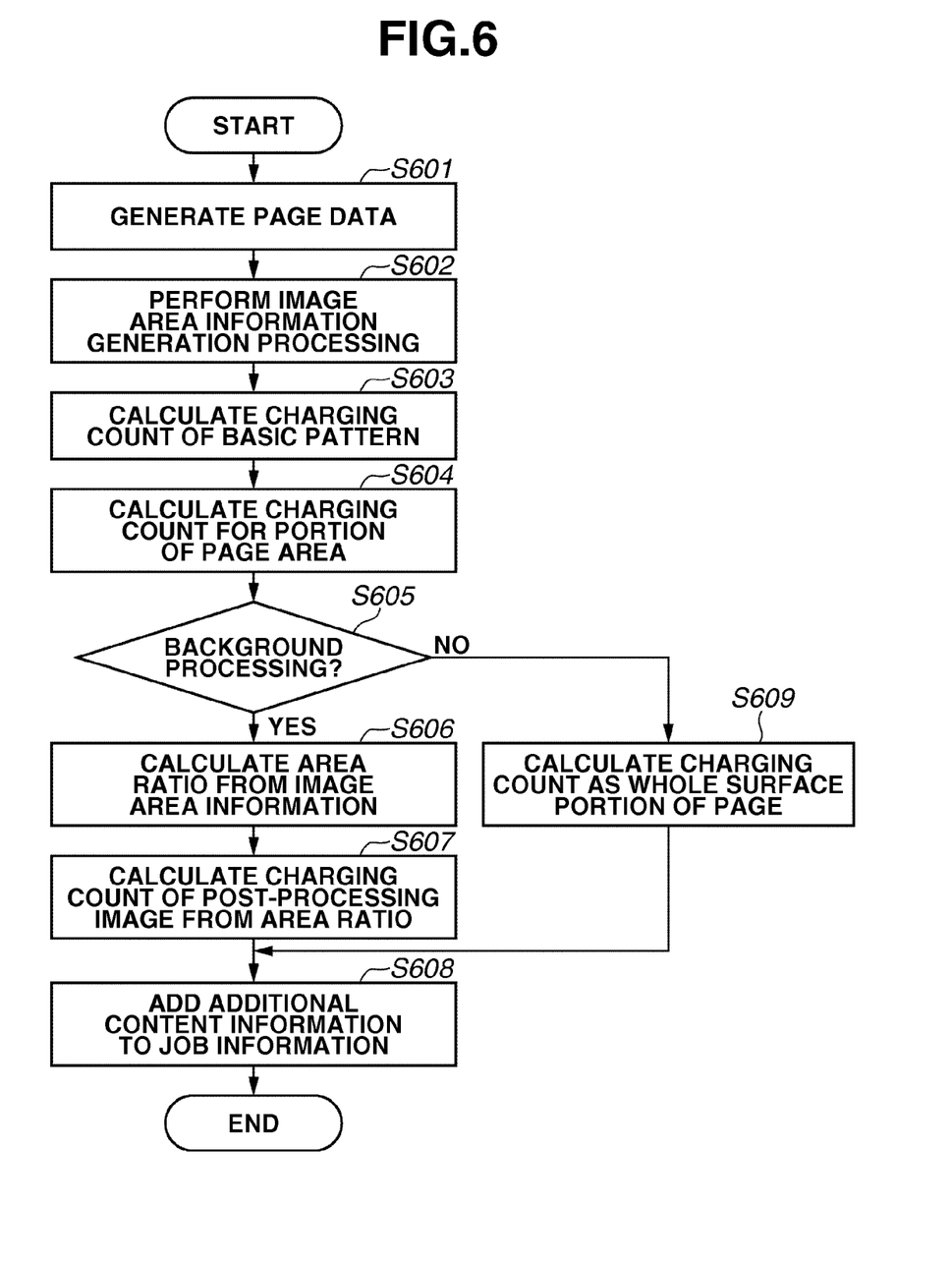
FIG. 6 illustrates an example of a flow chart related to charging processing of additional contents.

FIG. 6 illustrates an example of a flow chart related to processing for calculating the charging information of the additional contents (the charging processing of the additional contents).

In step S601, the page data generation unit 103 of the information processing apparatus 10 combines the additional contents in which the common image pattern is rasterized into a bit map by the post-processing image drawing unit 107 with the intermediate image data to generate PDL data.

In step S602, an image area information generation unit (not illustrated) in the job generation unit 101 generates image area information in the bit map data. In step S603, a charging count calculation unit (not illustrated) in the job generation unit 101 reads a common image pattern from the common pattern management unit 106 to calculate the charging count of the single unit of the common image pattern.

In step S604, the charging count calculation unit acquires page information from the page data generation unit 103 and calculates the charging count when the single unit of the common image pattern is developed to the whole page area.

In step S605, the charging count calculation unit determines whether the copy-forgery-inhibited pattern processing is subjected to background processing or overwriting processing based on the image area information. If the charging count calculation unit determines that the copy-forgery-inhibited pattern processing is subjected to the overwriting processing (NO in step S605), then in step S609, the charging count calculation unit calculates the charging count as a whole page area. Then, the processing proceeds to step S608. If the charging count calculation unit determines that the copy-forgery-inhibited pattern processing is subjected to the background processing (YES in step S605), the charging count calculation unit performs the processing in step S606.

In step S606, the charging count calculation unit calculates the area ratio of the background portion subjected to the copy-forgery-inhibited pattern processing to the whole page area based on the image area information. In step S607, the charging count calculation unit calculates the charging count of the background portion subjected to the copy-forgery-inhibited pattern processing from the calculated area ratio of the background portion subjected to the copy-forgery-inhibited pattern processing to the whole page area.

In step S608, the job information generation unit 102 adds the information about the charging information of the additional contents calculated by the charging count calculation unit to the job information.

Figure 7:
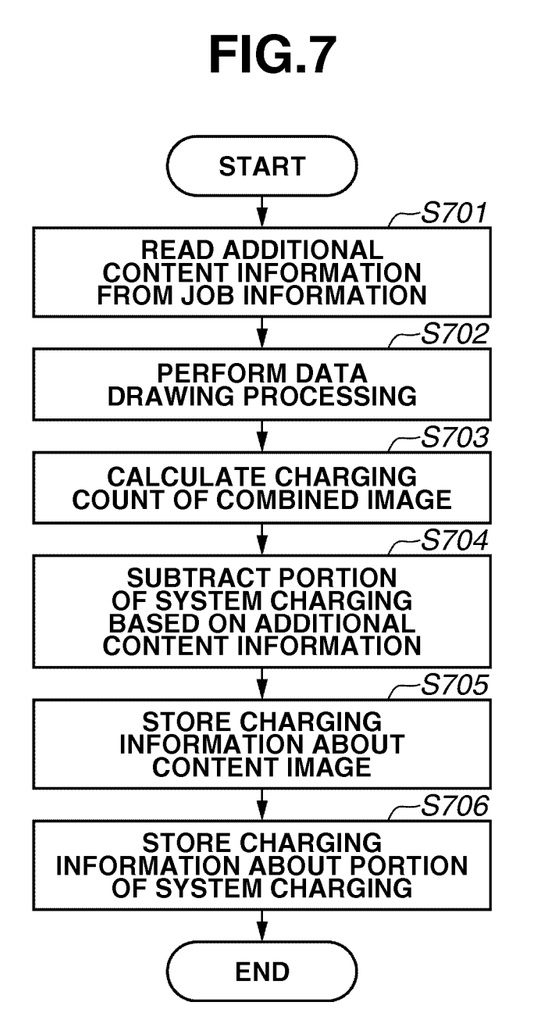
FIG. 7 illustrates an example of a flow chart related to charging processing of a content image.

FIG. 7 illustrates an example of a flow chart related to processing for calculating the charging information of the content image (charging processing of a content image).

In step S701, the job information analysis unit 114 of the image processing apparatus 30 reads the charging information of the additional contents from the job information in the job data. In step S702, the data drawing unit 116 generates bit map data (a composite image in which the content image is combined with the additional contents) from the intermediate data input from the page data analysis unit 115, and inputs the composite image to the intermediate image management unit 117.

In step S703, the charging count calculation unit 118 calculates the charging count from the composite image generated in the data drawing unit 116.

In step S704, the charging count calculation unit 118 subtracts the charging information about the additional contents (the portion of the system charging) read by the job information analysis unit 114 from the charging information about the composite image. Thus, the charging information about the content image can be calculated.

In step S705, the charging count calculation unit 118 temporarily stores the charging information about the content image in the storage area as the user charging. In step S706, the charging count calculation unit 118 temporarily stores the charging information about the additional contents read by the job information analysis unit 114 as the system charging.

According to the above-described configuration, a device for adding additional contents can calculate the charging information about the additional contents.

According to the above-described exemplary embodiments, more appropriate charging can be made for the output from the image processing apparatus.

Aspects of the present invention can also be realized by a computer of a system or apparatus (or devices such as a CPU or a micro processing unit (MPU)) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In an example, a computer-readable medium may store a program that causes an image processing apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-210997 filed Sep. 21, 2010, which is hereby incorporated by reference herein in its entirety.

What is claimed is:

1. An image processing apparatus comprising:
a generation unit configured to generate, from job data, image data, wherein the generated image data is independent of a model of the image processing apparatus in that the model-independent image data has yet to be subject to processing that is dependent on the model of the image processing apparatus;
a calculation unit configured to perform a first calculation of content charging information about contents included in the image data and
a second calculation of additional charging information about additional information added to the image data based on a method for adding the additional information to the image data; and
a storing unit configured to store, for each charging destination stored in a storage unit, the content charging information about the contents calculated by calculation unit in the first calculation and the additional charging information about the additional information calculated by the calculation unit in the second calculation
wherein the calculation unit switches between performing the second calculation based on an area of a background of the image data from a calculated area ratio or based on a whole page area of the image data depending on whether the additional information is added to a background of the image data or the additional information is overwritten on the image data in the method for adding the additional information to the image data,
wherein the additional information is a copy-forgery-inhibited pattern.

2. The image processing apparatus according to claim 1, wherein, prior to the generation unit generating the image data, the storage unit stores a plurality of types of pattern information used for generating a plurality of types of additional information, wherein the job data includes specific information for identifying pattern information about the additional information added to the image data, and wherein the second calculation unit identifies the pattern information corresponding to the specific information from the plurality of types of pattern information to calculate the additional charging information about the additional information generated from the identified pattern information as the additional charging information about the additional information added to the image data.

3. The image processing apparatus according to claim 2, wherein the storing unit determines and stores the charging destination of the additional charging information about the additional information added to the image data according to charging destination information in which the charging destination of the additional charging information about the additional information is specified for each function related to charging.

4. A charging system comprising:
an information processing apparatus that includes
a calculation unit configured to
calculate a second calculation of additional charging information about additional information added to image data based on a method for adding the additional information to the image data, wherein the image data is independent of a model of an image processing apparatus in that the model-independent image data has yet to be subject to processing that is dependent on the model of the image processing apparatus, and
wherein the calculation unit of the information processing apparatus switches between performing the second calculation based on an area of a background of the image data from a calculated area ratio or based on a whole page area of the image data depending on whether the additional information is added to a background of the image data or the additional information is overwritten on the image data in the method for adding the additional information to the image data,
wherein the additional information is a copy-forgery-inhibited pattern;
a transmission unit configured to
to transmit, to the image processing apparatus, job data used for generating the image data by adding the additional charging information about the additional information to the job data; and
the image processing apparatus, wherein the image processing apparatus includes:
a reading unit configured to read the additional charging information about the additional information from the job data received by the image processing apparatus,
a generation unit configured to generate the image data from the job data,
calculation unit configured to calculate content charging information about contents included in the image data; and
a storing unit configured to store, for each charging destination stored in a storage unit, the content charging information about the contents calculated by the calculation unit of the image processing apparatus and the additional charging information about the additional information calculated by the calculation unit of the information processing apparatus.

5. A method for charging executed in an image processing apparatus, the method comprising:
generating, from job data, image data, wherein the generated image data is independent of a model of the image processing apparatus in that the model-independent image data has yet to be subject to processing that is dependent on the model of the image processing apparatus;
calculating, as a first calculation by a calculation unit, content charging information about contents included in the image data;
calculating, as a second calculation by the calculation unit, additional charging information about additional information added to the image data based on a method for adding the additional information to the image data; and
storing, for each charging destination stored in a storage unit, the content charging information about the contents calculated by the first calculation and the additional charging information about the additional information calculated by the second calculation
wherein the calculation unit switches between performing the second calculation based on an area of a background of the image data from a calculated area ratio or based on a whole page area of the image data depending on whether the additional information is added to a background of the image data or the additional information is overwritten on the image data in the method for adding the additional information to the image data,
wherein the additional information is a copy-forgery-inhibited pattern.

6. A non-transitory computer-readable medium storing a program that causes an image processing apparatus to perform the method according to claim 5.

7. A method for charging executed in a charging system having an information processing apparatus and an image processing apparatus, the method comprising:
calculating, via the information processing apparatus, a second calculation of additional charging information about additional information added to image data based on a method for adding the additional information to the image data, wherein the image data is independent of a model of an image processing apparatus in that the model-independent image data has yet to be subject to processing that is dependent on the model of the image processing apparatus;
switching between performing the second calculation based on an area of a background of the image data from a calculated area ratio or based on a whole page area of the image data depending on whether the additional information is added to a background of the image data or the additional information is overwritten on the image data in the method for adding the additional information to the image data,
wherein the additional information is a copy-forgery-inhibited pattern;
transmitting, to the image processing apparatus from the information processing apparatus, job data used for generating the image data by adding the additional charging information about the additional information to the job data;
reading, via the image processing apparatus, the additional charging information about the additional information from the job data received by the image processing apparatus;
generating, via the image processing apparatus, the image data from the job data;
calculating, via the image processing apparatus, content charging information about contents included in the image data; and
storing, via the image processing apparatus and for each charging destination stored in a storage unit, the calculated content charging information about the contents and the calculated additional charging information about the additional information.

8. The image processing apparatus according to claim 1, wherein processing that is dependent on the model of the image processing apparatus includes at least one of halftone processing and color correction, the image processing apparatus further comprising a post-processing image drawing unit, wherein the post-processing image drawing unit subjects the contents common to the model to the halftone processing and the color correction to convert the contents into an image that is dependent on the model as a model dependence image.

9. The image processing apparatus according to claim 1, wherein the image processing apparatus counts charging for an image portion designated by a user independently from charging for an image portion designated by a system manger.

* * * * *